United States Patent
Brack et al.

(10) Patent No.: US 6,653,434 B2
(45) Date of Patent: Nov. 25, 2003

(54) PROCESS FOR THE PRODUCTION OF POLYCARBONATE

(75) Inventors: Hans-Peter Brack, Bergen op Zoom (NL); Daniel Joseph Brunelle, Burnt Hills, NY (US); James Anthony Cella, Clifton Park, NY (US); Dennis Karlik, Bergen op Zoom (NL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/026,276

(22) Filed: Dec. 19, 2001

(65) Prior Publication Data

US 2002/0123603 A1 Sep. 5, 2002

Related U.S. Application Data

(60) Provisional application No. 60/258,701, filed on Dec. 28, 2000.

(51) Int. Cl.$^7$ .............................................. C08G 64/00
(52) U.S. Cl. ...................................... 528/196; 528/198
(58) Field of Search .................................. 528/196, 198

(56) References Cited

U.S. PATENT DOCUMENTS

| 3,442,854 A | 5/1969 | Curtius et al. |
| 5,026,817 A | 6/1991 | Sakashita et al. |
| 5,097,002 A | 3/1992 | Sakashita et al. |
| 5,142,018 A | 8/1992 | Sakashita et al. |
| 5,151,491 A | 9/1992 | Sakashita et al. |
| 5,283,285 A | 2/1994 | Akkapeddi et al. |
| 5,340,905 A | 8/1994 | Kühling et al. |
| 5,696,222 A | 12/1997 | Kaneko et al. |
| 6,022,943 A | 2/2000 | Inoue et al. |
| 6,252,036 B1 | 6/2001 | Hatono et al. |
| 6,300,459 B1 | 10/2001 | Kaneko et al. |

FOREIGN PATENT DOCUMENTS

| EP | 764 673 B1 | 3/1997 |
| EP | 980 861 A1 | 2/2000 |
| EP | 0 982 340 A1 | 3/2000 |
| EP | 985 696 A1 | 3/2000 |
| JP | 2153925 | 6/1990 |
| JP | 2189347 | 7/1990 |
| JP | 6157739 | 6/1994 |
| JP | 6329891 | 11/1994 |
| JP | 7090074 | 4/1995 |

OTHER PUBLICATIONS

PCT International Search Report for International Application No. PCT/US 01/49211.

*Primary Examiner*—Terressa M. Boykin
(74) *Attorney, Agent, or Firm*—Oppedahl & Larson LLP

(57) ABSTRACT

A process for the production of polycarbonate by melt-polycondensing an aromatic dihydroxy compound and diphenylcarbonate, the process comprising adding the to polycarbonate under melt conditions a compound of the formula (1):

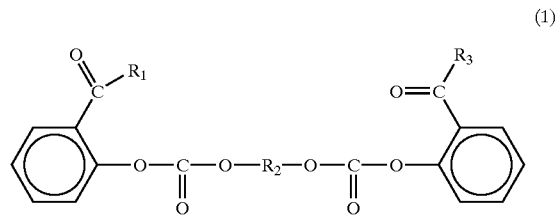

(1)

wherein $R_1$ and $R_3$ may be the same or different and are selected from the group consisting of alkoxy, phenoxy, benzoxy, aryloxy, phenyl and aryl groups, $R_2$ is selected from the group consisting of alkyl, phenyl, aryl, or aralkyl groups.

16 Claims, No Drawings

PROCESS FOR THE PRODUCTION OF POLYCARBONATE

CROSS REFERENCE TO RELATED APPLICATIONS

This application claims priority to U.S. Provisional Application Serial No. 60/258,701 filed on Dec. 28, 2000, which is incorporated herein by reference in its entirety.

FIELD OF THE INVENTION

The present invention relates to a process for the production of polycarbonate. More specifically, it relates to a process for the production of a polycarbonate whose polymerization degree is enhanced by the use of a polymerizing promoter.

BACKGROUND OF THE INVENTION

Polycarbonate is excellent in mechanical properties such as impact resistance and is also excellent in heat resistance and transparency, and it is widely used in many engineering applications. In a method for producing a polycarbonate, an aromatic dihydroxy compound such as bisphenol and a diaryl carbonate such as diphenyl carbonate are reacted in ester exchange in a molten state (melt-polycodensation method). It is known to enhance the polymerization degree of the polycarbonate in a melt-polycondensation method by adding polymerization promoters to the reaction system. The increase molecular weight build-up results in increased polycarbonate output through less residence time in the reactor and a lower reactor temperature, consequently facilitating simpler and less expensive reactor design.

JP-A 7-90074 discloses a method of producing a polycarbonate from a dihydric compound and a carbonic acid diester by an ester exchange method, in which a highly active diester, acid halide or acid anhydride with at least two functional groups is added after the ester exchange ratio exceeds 70% to obtain a polycarbonate having an enhanced polymerization degree. It should be noted that JP-A 7-90074 teaches the use of highly active carbonic acid diesters based on 4-nitrophenol, 4-cyanophenol and chlorinated phenols, e.g. bis(4-nitrophenyl) carbonate, bis(4-cyanophenyl) carbonate, and bis(4-chlorophenyl) carbonate. The use of these compounds results in the production of colored or potentially toxic or explosive byproducts or ones that produce gaseous products containing chlorine upon combustion. Thus from product quality (transparency), handling, and environmental considerations there is a demand for the use of polymerization promoters that are free from chlorine, cyano-, and nitroactivating groups.

U.S. Pat. No. 5,696,222 discloses a method of producing a polycarbonate having an enhanced polymerization degree by the addition of certain polymerization promoters, e.g., carbonates and dicarboxylic acid aryl esters including bis(2-methoxyphenyl) carbonate, bis(2-ethoxyphenyl) carbonate, bis(2-chlorophenyl) carbonate, bis(2-methoxyphenyl) terphthalate and bis(2-methoxyphenyl) adipate. It should be noted that U.S. Pat. No. 5,696,222 teaches the introduction of ester linkages when esters are used as a polymerization promoter, with the results being the production of polyester carbonate copolymers (instead of homopolymers) and less hydrolytic stability.

There is still a need for an improved process for the production of a polycarbonate having an enhanced polymerization degree.

SUMMARY OF THE INVENTION

The invention relates to a process for the production of polycarbonate, the process comprising adding a polymerization promoting compound of the formula (1):

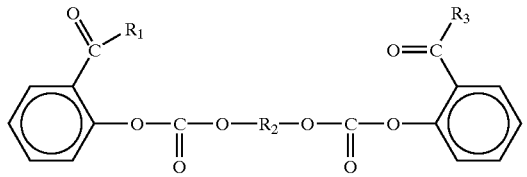

(1)

wherein $R_1$ and $R_3$ may be the same or different and are selected from the group consisting of alkoxy, phenoxy, benzoxy, aryloxy, phenyl and aryl groups.

$R_2$ is selected from the group consisting of alkyl, phenyl, aryl, or aralkyl groups. The phenyl, aryl or aralkyl may be optionally substituted. The alkyl groups may be any one of linear, branched, and cyclic alkyl groups.

In one embodiment, the polymerization promoter is selected from the group prepared from salicylate esters and bis-chloroformates of bisphenols.

In one embodiment, the polymerization promoter is selected from the group consisting of BPA-bis-methyl salicyl carbonate, BPA-bis-n-propyl salicyl carbonate, BPA-bis-benzyl salicyl carbonate, and mixtures thereof.

In another embodiment of the invention a large proportion of, the polymerization promoter is added to the polycarbonate oligomer after the oligomer has reached a number-average molecular weight of about 2,500 to 15,000 Dalton.

DETAILED DESCRIPTION OF THE INVENTION

Polymerization Promoter/Coupling Agent

In the process of the present invention, the compound of the following formula (1) is added to a polycarbonate oligomer to build its molecular weight:

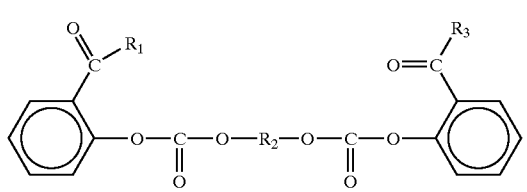

(1)

wherein $R_1$ and $R_3$ may be the same or different and are selected from the group consisting of alkoxy, phenoxy, benzoxy, aryloxy, phenyl and aryl groups. $R_2$ is selected from the group consisting of alkyl, phenyl, aryl, or aralkyl groups. The phenyl, aryl or aralkyl may be optionally substituted. The alkyl groups may be any one of linear, branched, and cyclic alkyl groups. In one embodiment, $R_1$ and $R_3$ are selected from the group consisting of methoxy, ethoxy, n-propoxy, benzoxy, phenoxy, phenyl, and methoxycarbonyl. In another embodiment the polymerization promoter is selected from the group prepared from bis-chloroformates of bisphenols. In yet another embodiment, the polymerization promoter is BPA bis-methyl salicyl carbonate.

Preparation

In one embodiment of the invention, the polymerization promoter is prepared by the reaction of appropriate bis-chloroformates (e.g., BPA-bis-chloroformate) with two equivalents of an activated phenol, such as methyl salicylate, in a solvent such as methylene chloride in the presence of a base to neutralize the liberated HCl. Additional catalysts may be employed in this reaction to facilitate the condensation reaction. After completion of the condensation reaction, the product solution is washed with aqueous acid and base then with water until the washings are neutral. The organic solvent may be removed by distillation and the polymerization promoter is crystallized and recovered.

The condensation reaction to prepare the polymerization promoter of the present invention may be carried out under anhydrous conditions known in the art using one or more equivalents of a tertiary amine per equivalent of chloroformate as the base, or under interfacial conditions also well-known in the art using aqueous sodium hydroxide as the base in the presence of a condensation catalyst. In one embodiment, the condensation catalyst is triethyl amine, quaternary alkyl ammonium salt, or mixtures thereof.

Polycarbonate Production Process

The polymerization promoter of the present invention may be used to build the molecular weight of polycarbonate oligomer prepared either by the interfacial process or the melt process. It functions as a coupling agent and reacts with the terminal hydroxy group (•www•OH) of the polycarbonate to increase the molecular weight of the polycarbonate as shown below:

Hall Ltd., as well as in a number of U.S. patents, including U.S. Pat. Nos. 3,442,854; 5,026,817; 5,097,002; 5,142,018; 5,151,491; and 5,340,905.

In the melt process, polycarbonate is produced by the melt polycondensation of aromatic dihydroxy compounds (A) and carbonic acid diesters (B). The reaction can be carried out by either a batch mode or a continuous mode. The apparatus in which the reaction is carried out can be any suitable type of tank, tube, or column. The continuous processes usually involve the use of one or more CSTR's and one or more finishing reactors.

Examples of the aromatic dihydroxy compounds (A) include bis(hydroxyaryl) alkanes such as bis(4-hydroxyphenyl)methane; 1,1-bis(4-hydroxyphenyl)ethane; 2,2-bis(4-hydroxyphenyl)propane (also known as bisphenol A); 2,2-bis(4-hydroxyphenyl)butane; 2,2-bis(4-hydroxyphenyl)octane; bis(4-hydroxyphenyl) phenylmethane; 2,2-bis(4-hydroxy-1-methylphenyl) propane; 1,1-bis(4-hydroxy-t-butylphenyl) propane; and 2,2-bis(4-hydroxy-3-bromophenyl) propane; bis (hydroxyaryl)cycloalkanes such as 1,1-(4-hydroxyphenyl) cyclopentane and 1,1-bis(4-hydroxyphenyl)cyclohexane; dihydroxyaryl ethers such as 4,4'-dihydroxydiphenyl ether and 4,4'dihydroxy-3,3'-dimethylphenyl ether; dihydroxydi-

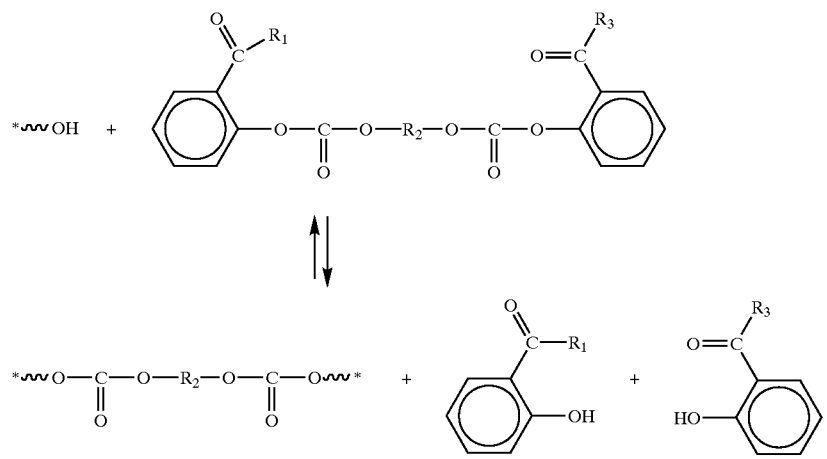

If added to a melt reactor, the ortho-substituted phenols are removed by distillation to the over-head system to expedite the terminal blocking at high yields. The phenols may be recovered and recycled/reused in preparing additional polymerization promoters.

It should be noted that the increased molecular weight polycarbonate may still contain small amounts of any unrecovered phenols, any unreacted polymerization promoters along with by-products of any side reactions to the polymerization promotion reactions, e.g. terminal 2-(alkoxycarbonyl)phenyl groups and the like. In one embodiment, the terminal-blocked polycarbonate contains about less than 500 ppm of ortho-substituted phenols and about 500 ppm of unreacted polymerization promoters of the present invention. In another embodiment, the increased molecular weight polycarbonate contains about 2,500 ppm or less of terminal 2-(alkoxycarbonyl)phenyl groups.

Melt Polycarbonate Process

In one embodiment of the present invention, the promoter is added to a melt or transesterification process. The production of polycarbonates by transesterification is well-known in the art and described, for example, in Organic Polymer Chemistry by K. J. Saunders, 1973, Chapman and aryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; and dihydroxydiaryl sulfones such as 4,4'-dihydroxydiphenyl sulfone and 4,4'dihydroxy-3,3'-dimethyldiphenyl sulfone. In one embodiment, the aromatic dihydroxy compound is bisphenol A (BPA).

Examples of the carbonic acid diesters (B) include diphenyl carbonate; ditolyl carbonate; bis(chlorophenyl) carbonate; m-cresyl carbonnate; dinaphthyl carbonate; bis (diphenyl) carbonate; diethyl carbonate; dimethyl carbonate; dibutyl carbonate; and dicyclohexyl carbonate. In one embodiment of an industrial process, diphenyl carbonate (DPC) is used.

In one embodiment of the invention, the polymerization promoter is added together with DPC or another diaryl carbonate to form high end-cap levels of polycarbonate.

The carbonic diester component may also contain a minor amount, e.g., up to about 50 mole % of a dicarboxylic acid or its ester, such as terephthalic acid or diphenyl isophthalate, to prepare polyesterpolycarbonates.

In preparing the polycarbonates, usually about 1.0 mole to about 1.30 moles of carbonic diester are utilized for every 1 mole of the aromatic dihydroxy compound. In one embodiment, about 1.01 moles to about 1.20 moles of the carbonic diester is utilized.

Terminators/Encapping Agents

In one embodiment of the melt process, terminators or encapping agents may also used in the manufacture of the polycarbonate. Examples of terminators include phenol, p-tert-butylphenol, p-cumylphenol, octylphenol, nonylphenol and other endcapping agents well-known in the art.

Branching Agents

In one embodiment of the process of the present invention, branching agents are used as needed. Branching agents are well known and may comprise polyfunctional organic compounds containing at least three functional groups, which may be hydroxyl, carboxyl, carboxylic anhydride, and mixtures thereof. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis (p-hydroxyphenyl)-ethyl) alpha, alpha-dimethyl benzyl)phenol, trimesic acid and benzophenone tetracarboxylic acid.

Optional Catalysts

The polycarbonate synthesis may be conducted in the presence of a catalyst to promote the transesterification reaction. Examples include alkali metals and alkaline earth metals by themselves or as oxides, hydroxides, amide compounds, alcoholates, and phenolates, basic metal oxides such as ZnO, PbO, and $Sb_2O_3$, organotitanium compounds, soluble manganese compounds, nitrogen-containing basic compounds and acetates of calcium, magnesium, zinc, lead, tin, manganese, cadmium, and cobalt, and compound catalyst systems such as a nitrogen-containing basic compound and a boron compound, a nitrogen-containing basic compound and an alkali (alkaline earth) metal compound, and a nitrogen-containing basic compound, an alkali (alkaline earth) metal compound, and a boron compound.

In one embodiment of the invention, the transesterification catalyst is a quaternary ammonium compound or a quaternary phosphonium compound. Non-limiting examples of these compounds include tetramethyl ammonium hydroxide, tetramethyl ammonium acetate, tetramethyl ammonium fluoride, tetramethyl ammonium tetraphenyl borate, tetraphenyl phosphonium fluoride, tetraphenyl phosphonium tetraphenyl borate, tetrabutyl phosphonium hydroxide, and dimethyl diphenyl ammonium hydroxide.

The above-mentioned catalysts may each be used by itself, or, depending on the intended use, two or more types may be used in combination. When more than one catalyst is employed, each may be incorporated into the melt at a different stage of the reaction.

The appropriate level of catalyst will depend in part on how many catalysts are being employed, e.g., one or two. In general, the total amount of catalyst is usually in the range of about $1 \times 10^{-8}$ to about 1.0 mole per mole of the dihydroxy compound. In one embodiment, the level is in the range of about $1 \times 10^{-5}$ to about $5 \times 10^{-2}$ mole per mole of dihydroxy compound. When more than one catalyst is employed, each may be incorporated into the melt at a different stage of the reaction.

Optional Components in the Polycarbonate

In the present invention, the polycarbonate obtained may further contain a heat stabilizer, an ultraviolet absorbent, a mold releasing agent, a colorant, an anti-static agent, a lubricant, an anti-fogging agent, a natural oil, a synthetic oil, a wax, an organic filler and an inorganic filler, which are generally used in the art.

Adding the Polymerization Promoter to a Melt Process

The method of adding the promoter of the present invention to polycarbonate is not specially limited. For example, the promoter may be added to the polycarbonate as a reaction product while the polycarbonate is being formed or in a molten state, or it may be added to the polycarbonate during extrusion or pelletization, or when the polycarbonate is still in a molten state between a final polymerization reactor and an extruder or pelletizer.

The polymerization promoter is added at a stoichiometry rate of about between 0.1 and 2.5 relative to the free OH content of the polycarbonate oligomer to which it is added. In one embodiment, it is added at a stoichiometry rate of about 0.2 to 1.5. In another embodiment, it is added at a stoichiometry rate of about 0.3 to 1.2.

The promoter of the present invention may be added to the polycarbonate oligomer by various means and at various stages depending on the equipment used and the process conditions, e.g., in the batch reactor, continuous reactor system, or in an extruder. In one embodiment of the melt process, it is added to a later reactor in a continuous reaction system. In another embodiment, it is added between the last reactor in the system and the first polymerizer in a continuous melt reactor system. In yet another embodiment, it is added between the $1^{st}$ and $2^{nd}$ polymerizers in a continuous melt reactor system. The reactors used for the above reaction may have the form of any one of a vessel, a tube or a column.

In one embodiment, the promoter is added to the process of the present invention after a polycarbonate oligomer is formed in the molten state. In a preferred embodiment, at least 80% (and more preferably 90%) of the total amount of the promoter is added when after the polycarbonate oligomer has reached a number-average molecular weight Mn of about 2,500 to 15,000 Dalton. In another embodiment of the invention, the polymerization promoter is added after the polycarbonate oligomer has reached an Mn of about 4,000 to 10,000 Dalton.

In one embodiment, the promoter is added to the process of the present invention after a polycarbonate oligomer is formed in the molten state and for a period of about 10 minutes to 90 minutes at a reaction temperature of about 200 to 350° C. In a second embodiment, the reaction time is about 30 to 60 minutes at a reactor temperature of about 300° C.

The apparatus/method for feeding the promoter is not specially limited. The promoter may be added in the form of a solid, a liquid, a melt or a solution thereof in a solvent. Further, the promoter may be added in a predetermined amount once, or it may be separated into predetermined amounts and added several times. In one embodiment, it is added to the process as a powder by means of a static mixer.

EXAMPLES

The present invention will be explained hereinafter with reference to Examples, while the present invention shall not be limited by Examples. In the Examples, the following measurements were made.

a) Molecular weight: Mw and Mn were measured by GPC analysis of 1 mg/ml polymer solutions in methylene chloride versus polystyrene standards.

Polymerization Promoter

In examples 1–4, the polymerization promoter used was BPA bis-methyl salicylate carbonate. The polymerization promoter was prepared by the following two methods and used interchangeably in the examples 1–4;

a) Anhydrous method: A solution of BPA chloroformate, 16.80 g (0.0476 mol) in 50 ml of dry toluene was added over about 40 minutes to a solution of 14.6 g (0.0957 mol) methyl salicylate, plus 10.164 g (0.0.1006 mol, 14 ml) triethylamine in 100 ml of toluene. The mixture was stirred mechanically for two hours after addition of the chloroformate. The resulting mixture was filtered and solids were washed with toluene. The combined filtrate and washings were transferred to a separatory funnel and washed with equal volumes of $H_2O$, 10% HCl (2x), 2.5% NaOH (1x) and brine (1x). The organic layer was further dried by passage through a cone of anhydrous $CaSO_4$ and solvent was removed using a rotary evaporator. The crude residue, solidified on cooling after seeding with a small crystal of the product. The solid was recrystallized from ether-hexane to afford about 24.2 g (87%) of the pure BPA bis-methyl salicylate carbonate.

b) Interfacial method: A solution of sodium hydroxide, 4.14 g (0.104 mol) and methyl tributyl ammonium chloride, 0.35 ml of a 70% aqueous solution (1.02 mmol) in water, 75 ml, was extracted with 2x75 ml of hexane then added over 15 minutes to a stirred solution of methyl salicylate, 14.58 g (0.096 mol) and BPA bis-chloroformate, 16.80 g (0.0476 mol) in 150 ml of methylene chloride. The mixture was stirred an additional 10 minutes and the phases were separated. The organic phase was washed with equal volumes of 10% HCl, 5% $Na_2CO_3$, water and brine (satd. NaCl) then dried by passage through a cone of anhydrous $CaSO_4$. Evaporation of solvent afforded 27.3 g (98.3%) of the pure BPA bis-methyl salicylate carbonate.

Starting Material Polycarbonate

In all examples, the starting polycarbonate grade as prepared by a melt process has properties as follows:

| | |
|---|---|
| Weight-average molecular weight Mw: | $18.3 * 10^3$ g/mole |
| Number-average molecular weight Mn: | $7.52 * 10^3$ g/mole |
| Free OH content: | 670 ppm |

Examples 1–4

In examples 1–4, a batch reactor tube was charged with 25 g of the starting polycarbonate and varying amounts between 0.3167 g ($5.420*10^{-4}$ mole or 0.55 mole per mole of —OH group) to 0.633525 g ($1.084*10^{-3}$ mole or 1.1 mole per mole of —OH group) of BPA-bis-methyl salicyl carbonate under nitrogen. The mixture was heated to a temperature of 300° C. and stirred for about 20 minutes. After the melt mixing stage, vacuum was applied to the system to a pressure of 0.5 mbar and the reaction was continued for 10–40 minutes. Formed phenols were distilled off. After the reaction stage, the polymer was sampled from the reaction tube for number and weight average molecular weight.

Comparative Example 1

The conditions are identical to that of example 1 with the residence time in the reaction under vacuum stage of 20 minutes, except that instead of using BPA-bis-methyl salicyl carbonate, the polymerization promoter used is as disclosed in U.S. Pat. No. 5,696,222, bis-methyl salicyl carbonate.

Comparative Example 2

The conditions are identical to that of example 2 with the residence time in the reaction under vacuum stage of 10 minutes. U.S. Pat. No. 5,696,222 promoter, bis-methyl salicyl carbonate, was used instead of BPA-bis-methyl salicyl carbonate.

Comparative Example 3

Reactor conditions are identical to that of example 3 with the residence time in the reaction under vacuum stage of 20 minutes and U.S. Pat. No. 5,696,222 promoter, bis-methyl salicyl carbonate, was used instead of the BPA-bis-methyl salicyl carbonate of the present invention.

Comparative Example 4

U.S. Pat. No. 5,696,222 promoter bis-methyl salicyl carbonate was used instead of BPA-bis-methyl salicyl carbonate for identical conditions of 40 minute reaction under vacuum in example 4.

Comparative Example 5

The conditions are identical to that of example 1 with the residence time in the reaction under vacuum stage of 20 minutes and with a different non-activated carbonate as polymerization promoter, diphenyl carbonate, instead of BPA-bis-methyl salicyl carbonate.

Comparative Example 6

No polymerization promoter was used at all for the coupling reaction of example 1 with 20 minutes in the reaction under vacuum stage.

The results of the polymerization promotion reaction examples are shown in Table 1 as follows:

TABLE 1

| Example | Promoter Used | Amount mole/ —OH | Reaction time min. | Mw g/mole | Mn g/mole |
|---|---|---|---|---|---|
| Comp. 6 | — | — | 20 | 20992 | 11740 |
| Comp. 1 | Bis-methyl salicyl carbonate | 1.1 | 20 | 21471 | 9446 |
| Comp. 2 | Bis-methyl salicyl carbonate | 0.55 | 10 | 20968 | 9299 |
| Comp. 3 | Bis-methyl salicyl carbonate | 0.55 | 20 | 21430 | 9576 |
| Comp. 4 | Bis-methyl salicyl carbonate | 0.55 | 40 | 22655 | 9842 |
| Comp. 5 | Diphenyl carbonate | 1.1 | 20 | 21058 | 11692 |
| 1 | BPA-bis-methyl salicyl carbonate | 1.1 | 20 | 31062 | 11349 |
| 2 | BPA-bis-methyl salicyl carbonate | 0.55 | 10 | 22035 | 8950 |
| 3 | BPA-bis-methyl salicyl carbonate | 0.55 | 20 | 35530 | 13489 |
| 4 | BPA-bis-methyl salicyl carbonate | 0.55 | 40 | 51576 | 18374 |

While forms of the invention have been illustrated and described, modifications can be made without departing from the spirit and scope of the invention. Accordingly, it is not intended that the invention be limited thereby.

What is claimed is:

1. A process for the production of an aromatic polycarbonate, the process comprising adding to a polycarbonate oligomer-reaction mixture under melt conditions a compound of the formula (1), forming a polycarbonate with an increased molecular weight in a polymerization promotion reaction:

(1)

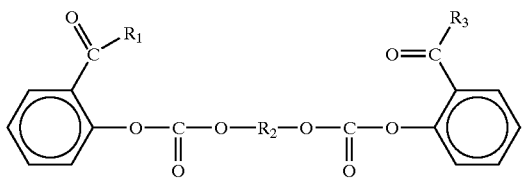

(A)

wherein $R_1$ and $R_3$ may be the same or different and are selected from the group consisting of alkoxy, phenoxy, benzoxy, aryloxy, phenyl and aryl groups. $R_2$ is selected from the group consisting of alkyl, phenyl, aryl, or aralkyl groups, and wherein at least 80% by weight of the total amount of the compound of formula (1) is added after the polycarbonate oligomer has reached a number-average molecular weight Mn of about 2,500 to 15,000 Dalton.

2. The process of claim 1, wherein the polycarbonate is produced by melt polymerizing a reaction mixture comprising an aromatic dihydroxy compound and diphenylcarbonate.

3. The process of claim 1, wherein the compound of the formula (1) is added to the reaction mixture under melt conditions of about 200° C. to 300° C. for at least 10 minutes.

4. The process according to claim 1, wherein the compound of the formula (1) is selected from the group consisting of BPA-bis-methyl salicyl carbonate, BPA-bis-n-propyl salicyl carbonate, BPA-bis-benzyl salicyl carbonate, and mixtures thereof.

5. The process according to claim 1, wherein the compound of the formula (1) is added in an amount of about 0.1 and 20 mole based on 1 mole equivalent of terminal hydroxyl groups of the polycarbonate formed at a time of the addition.

6. The process according to claim 1, wherein the compound of the formula (1) is added in an amount of about 0.2 and 1.25 mole based on 1 mole equivalent of terminal hydroxyl groups of the polycarbonate oligomer formed at a time of the addition.

7. The process according to claim 1, wherein the compound of the formula (1) is added in an amount of about 0.3 and 0.9 mole based on 1 mole equivalent of terminal hydroxyl groups of the polycarbonate oligomer formed at a time of the addition.

8. The process of claim 1, wherein the compound of the formula (1) is added to the process after the polycarbonate has reached a number-average molecular weight Mn of about 4,000 to 10,000 Dalton.

9. The process according to claim 2, wherein a portion of the total amount of the compound of formula (1) is added to the reaction of the aromatic dihydroxy compound and the diphenyl carbonate before the polycarbonate oligomer has reached a number-average molecular weight Mn of 2,500 Dalton.

10. The process according to claim 4, wherein the polymerization promoter is added in an amount of about 0.1 and 2.0 mole based on 1 mole equivalent of terminal hydroxyl groups of the polycarbonate formed at a time of the addition.

11. The process according to claim 1, wherein the formed polycarbonate has a content of ortho-substituted phenols generated in the polymerization promotion reaction of 500 ppm or below.

12. The process according to claim 1, wherein the formed polycarbonate has a content of ortho-substituted phenols generated in the polymerization promotion reaction of 100 ppm or below.

13. The process according to claim 1, wherein the formed polycarbonate has a content of polymerization promoter of 500 ppm or below.

14. The process according to claim 1, wherein the formed polycarbonate has a content of polymerization promoter of 100 ppm or below.

15. The process according to claim 1, wherein the formed polycarbonate has a content of terminal 2-(alkoxycarbonyl) phenyl groups of 2,500 ppm or below.

16. The process according to claim 1, wherein the formed polycarbonate has a content of terminal 2-(alkoxycarbonyl) phenyl groups of 1,000 ppm or below.

* * * * *